Feb. 14, 1956 J. A. FOGLE 2,734,329
BRUSH PICKER FOR A COTTON PICKING MACHINE
Filed March 2, 1954
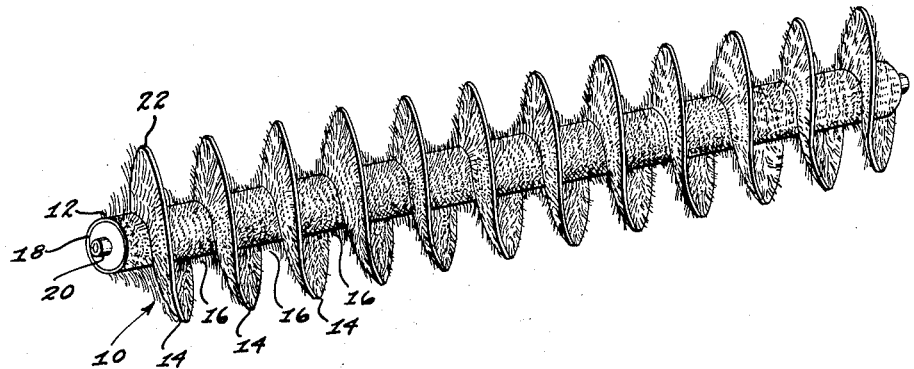
Fig. 1
Fig. 2
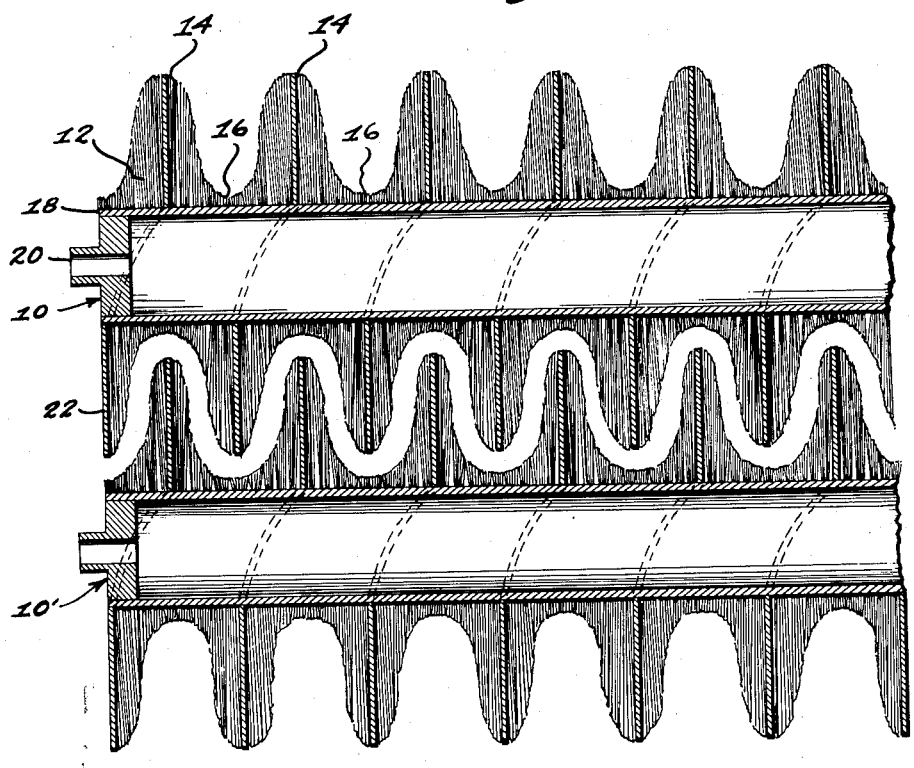
INVENTOR.
JOHN A. FOGLE
BY
Parrott & Richards
ATTORNEYS

2,734,329
BRUSH PICKER FOR A COTTON PICKING MACHINE

John A. Fogle, Neeses, S. C.

Application March 2, 1954, Serial No. 413,626

1 Claim. (Cl. 56—33)

This invention relates to cotton picking machines of the type incorporating a pair of opposed brush rolls for engaging and picking growing cotton, and more particularly to an improved form of brush roll for a cotton picking machine of this sort.

Brush rolls of the above noted type operate by rotation to provide picking action, the opposed brush rolls of a pair being disposed more or less horizontally for rotation about their principal axes and being spaced suitably for cooperation to pull the growing cotton from the plant. In operating a cotton picking machine employing brush rolls of this sort, the machine is moved along the crop rows as the brush rolls are rotated to engage and pick the cotton from the successive plants in the rows. Heretofore, it has been extremely difficult to adjust the brush rolls so that their picking action was carried out without also drawing in a considerable amount of plant material due to the fact that the motion of the cotton picking machine along the crop row tended to pull the plants horizontally and break off parts thereof as the cotton was being picked therefrom.

According to the present invention a brush roll is provided for cotton picking machines of this sort by which the horizontal pull on the plants from the motion of the machine along the crop rows can be substantially eliminated so as to allow the brush rolls to be devoted to the best advantage solely for picking cotton without the tendency to pull off plant material therewith as has previously been the case. For this purpose, the brush rolls of the present invention are characterized generally by a brush bristle covering in which the constituent bristles are arranged to form a spiral ridge and intervening valley lengthwise of the roll, with the form of this ridge and intervening valley being such as to internest at a uniform surface spacing with a like brush roll synchronized in opposed relation thereto. The result of this arrangement is to shift the picking action of the brush rolls for any given cotton boll along the surface of the rolls in a manner that can be made to balance the horizontal motion of the cotton picking machine and thereby exert the picking action of the rolls on the cotton boll without any substantial horizontal component.

These and other features of the present invention are described in further detail below in connection with the accompanying drawings, in which:

Fig. 1 is a perspective view of a brush roll embodying the present invention; and Fig. 2 is a fragmentary central longitudinal sectional detail further illustrating the construction of the brush roll in Fig. 1, and showing the internested relation between pairs of such rolls.

In Fig. 1, the brush roll illustrated as embodying the present invention is indicated generally by the reference numeral 10, the brush covering 12 thereon being shown arranged with a spiral ridge 14 and a valley as at 16 intervening between the convolutions of the spiral ridge 14.

Fig. 2 shows the construction of the brush roll 10 in further detail as comprising a roll core 18 fitted with suitable end hubs 20 at which the brush roll 10 may be mounted for rotation about its principal axis. Fig. 2 also represents in cross section the arrangement of the constituent bristles forming the brush covering 12 to provide the spiral ridge 14 and intervening valley 16. Preferably, a spiral rib 22 is also arranged on the roll core centrally with respect to the spiral ridge 14 in the brush covering 12 to support laterally the adjacent brush bristles of the covering 12 which must necessarily be of increased length in order to form the ridge 14.

A like brush roll 10' is illustrated in Fig. 2 internested with the previously described brush roll 10 as a pair of such rolls would be disposed for operation in a cotton picking machine, and the previously mentioned uniform surface spacing between the brush rolls 10 and 10' is seen in Fig. 2, as it may be maintained by synchronizing the rolls 10 and 10' for rotation together. Also, by adjusting the speed of rotation of these brush rolls 10 and 10' in relation to the rate of horizontal travel of the cotton picking machine carrying them, it will be seen that the effect of the ground movement of the machine can be eliminated in the picking action provided by the rolls 10 and 10'.

This invention has been described in detail above for purposes of illustration only and is not intended to be limited by this description or otherwise except as defined in the appended claim.

I claim:

A brush picker for a cotton picking machine comprising a roll core having a continuous brush bristle covering on the periphery thereof, said covering having the constituent bristles therein arranged to form a spiral ridge and intervening valley lengthwise of said core, the form of said ridge and intervening valley being such as to internest at a uniform surface spacing with a like brush picker synchronized in opposed relation thereto, and said roll core being cylindrical in form and having a spiral rib member arranged thereon centrally with respect to said ridge for supporting laterally the adjacent brush bristles of said covering.

References Cited in the file of this patent

UNITED STATES PATENTS

| Number | Name | Date |
|---|---|---|
| 626,613 | Hendrix | June 6, 1899 |
| 703,916 | Haley | July 1, 1902 |
| 790,834 | Harvey | May 23, 1905 |
| 1,025,062 | Howard | Apr. 30, 1912 |
| 1,058,460 | Porter | Apr. 8, 1913 |
| 1,222,645 | McIntosh | Apr. 17, 1917 |
| 1,378,021 | Gipson | May 17, 1921 |
| 1,420,062 | Skinner | June 20, 1922 |
| 1,722,747 | Hentz | July 30, 1929 |
| 2,180,594 | Kuhlman | Nov. 21, 1939 |
| 2,357,892 | Grant | Sept. 12, 1944 |
| 2,475,531 | Townsend | July 5, 1949 |
| 2,660,849 | Knowles | Dec. 1, 1953 |
| 2,664,686 | Witt | Jan. 5, 1954 |